United States Patent
Sasaki et al.

(10) Patent No.: US 10,283,776 B2
(45) Date of Patent: May 7, 2019

(54) ELECTRODE MATERIAL, AND ELECTRODE LAYER, BATTERY, AND ELECTROCHROMIC DEVICE USING THE ELECTRODE MATERIAL

(71) Applicants: KABUSHIKI KAISHA TOSHIBA, Tokyo (JP); TOSHIBA MATERIALS CO., LTD., Yokohama-Shi (JP)

(72) Inventors: Akito Sasaki, Yokohama (JP); Hideyuki Oozu, Yokohama (JP); Yoshinori Kataoka, Kawasaki (JP); Kuniyuki Kakushima, Tokyo (JP); Wei Li, Tokyo (JP); Hiroshi Iwai, Tokyo (JP)

(73) Assignees: Kabushiki Kaisha Toshiba, Minato-Ku (JP); Toshiba Materials Co., Ltd., Yokohama-Shi (JP)

( * ) Notice: Subject to any disclaimer, the term of this patent is extended or adjusted under 35 U.S.C. 154(b) by 0 days.

(21) Appl. No.: 15/508,257

(22) PCT Filed: Aug. 27, 2015

(86) PCT No.: PCT/JP2015/074197
§ 371 (c)(1),
(2) Date: Mar. 2, 2017

(87) PCT Pub. No.: WO2016/039157
PCT Pub. Date: Mar. 17, 2016

(65) Prior Publication Data
US 2017/0256797 A1    Sep. 7, 2017

(30) Foreign Application Priority Data
Sep. 11, 2014 (JP) ................................ 2014-185594

(51) Int. Cl.
*H01M 4/587* (2010.01)
*H01G 11/06* (2013.01)
(Continued)

(52) U.S. Cl.
CPC ............ *H01M 4/587* (2013.01); *H01G 11/06* (2013.01); *H01G 11/34* (2013.01); *H01G 11/42* (2013.01);
(Continued)

(58) Field of Classification Search
CPC ............................. H01M 4/587; H01G 11/34
(Continued)

(56) References Cited

U.S. PATENT DOCUMENTS 6,228,535 B1    5/2001  Fierro et al.
2009/0042095 A1  2/2009  Imagaki et al.
(Continued)

FOREIGN PATENT DOCUMENTS

CN    102869611 A    1/2013
JP    2002-522893 A1  7/2002
(Continued)

OTHER PUBLICATIONS

International Search Report and Written Opinion (Application No. PCT/JP2015/074197) dated Nov. 10, 2015.
(Continued)

*Primary Examiner* — James M Erwin

(57) ABSTRACT

The present invention provides an electrode material comprising at least one of metal compound powder and carbon powder, the powder having an average particle size of 50 μm or less and an activation energy $E_\alpha$ of 0.05 eV or less. Further, the powder preferably has hopping conduction characteristics at room temperature of 25° C. Furthermore, the powder preferably has an amount of oxygen defects of $1 \times 10^{18}$ cm$^{-3}$ or more. Still further, the powder preferably has
(Continued)

$$\rho(T) = \left\{ \underbrace{\left[ \frac{1}{qN_d\mu_b} \exp\left(\frac{qE_a}{kT}\right) \right]^{-1}}_{\text{Band Conduction}} + \underbrace{\left[ \frac{1}{qN_a\mu_h} \exp\left(\frac{q\varepsilon}{kT}\right) \right]^{-1}}_{\text{Hopping Conduction}} \right\}^{-1}$$

a carrier density of $1\times10^{18}$ $cm^{-3}$ or more. Due to above structure, there can be provided an electrode material having a high storage capacity and a high charge/discharge efficiency.

12 Claims, 7 Drawing Sheets

(51) Int. Cl.
*H01G 11/46* (2013.01)
*H01M 4/131* (2010.01)
*H01M 4/133* (2010.01)
*H01M 4/136* (2010.01)
*H01M 4/485* (2010.01)
*H01G 11/34* (2013.01)
*H01G 11/42* (2013.01)
*H01M 4/58* (2010.01)
*H01M 10/0525* (2010.01)
*H01M 4/02* (2006.01)

(52) U.S. Cl.
CPC ............ *H01G 11/46* (2013.01); *H01M 4/131* (2013.01); *H01M 4/133* (2013.01); *H01M 4/136* (2013.01); *H01M 4/485* (2013.01); *H01M 4/5815* (2013.01); *H01M 10/0525* (2013.01); *H01M 2004/021* (2013.01); *H01M 2004/027* (2013.01); *Y02E 60/13* (2013.01)

(58) Field of Classification Search
USPC ........................................ 429/231.5
See application file for complete search history.

(56) References Cited

U.S. PATENT DOCUMENTS

| | | | |
|---|---|---|---|
| 2009/0305132 | A1 | 12/2009 | Gauthier et al. |
| 2013/0063867 | A1* | 3/2013 | Naoi ...................... B82Y 30/00 |
| | | | 361/505 |
| 2013/0078517 | A1* | 3/2013 | Shon ................... H01M 4/0471 |
| | | | 429/221 |
| 2015/0034149 | A1 | 2/2015 | Sasaki et al. |

FOREIGN PATENT DOCUMENTS

| | | |
|---|---|---|
| JP | 2008-542979 A1 | 11/2008 |
| JP | 2009-043679 A1 | 2/2009 |
| JP | 2013-211112 A1 | 10/2013 |
| WO | 2013/146194 A1 | 10/2013 |

OTHER PUBLICATIONS

English Translation of International Preliminary Report on Patentability, International Application No. PCT/JP2015/074197, dated Mar. 14, 2017 (6 pages).

Chinese Office Action (with English translation), Chinese Application No. 201580048801.8, dated Sep. 25, 2018 (11 pages).

* cited by examiner $$\rho(T) = \left\{ \left[ \frac{1}{qN_d\mu_b} \exp\left(\frac{qE_a}{kT}\right) \right]^{-1} + \left[ \frac{1}{qN_o\mu_h} \exp\left(\frac{q\varepsilon}{kT}\right) \right]^{-1} \right\}^{-1}$$

$\underbrace{\phantom{xxxxxxxxxxxxxxxxx}}_{\text{Band Conduction}}$ $\underbrace{\phantom{xxxxxxxxxxxxxxxxx}}_{\text{Hopping Conduction}}$

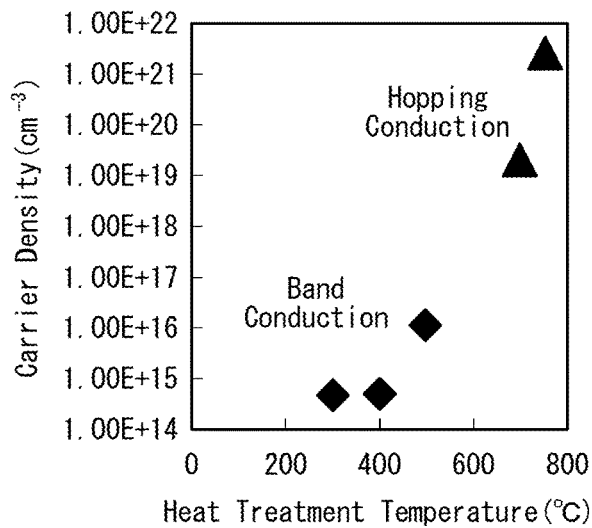
FIG. 3
$$\mu_H = \frac{1}{6} \cdot \frac{qR_H^2}{kT} \underbrace{\exp(-2\alpha R_H)}_{\text{Overlap of Wave Functions}} v_{ph} \underbrace{\exp\left(-\frac{W_H}{kT}\right)}_{\substack{\text{Probability of} \\ \text{Hopping of Energy } W_H \\ \text{to Higher Order}}}$$
FIG. 4
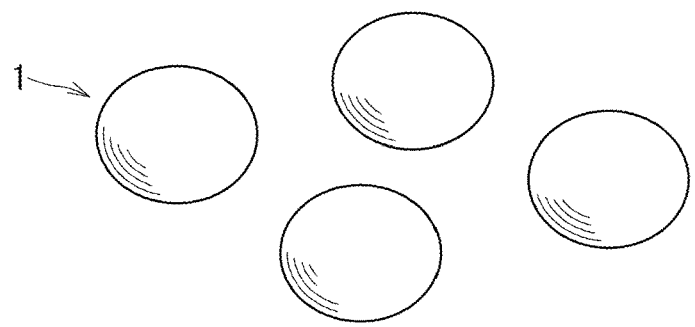
FIG. 5

ELECTRODE MATERIAL, AND ELECTRODE LAYER, BATTERY, AND ELECTROCHROMIC DEVICE USING THE ELECTRODE MATERIAL

BACKGROUND OF THE INVENTION

1. Field of The Invention

The later-described embodiments relate to an electrode material exhibiting hopping conduction characteristics, and to an electrode layer, a battery, and an electrochromic device that use the electrode material.

2. Description of Related Art

For electrode materials, various materials such as metal oxides and carbons are used. International Publication No. WO 2013/146194 (Patent Document 1) discloses a battery electrode material using tungsten oxide powder.

As described in Patent Document 1, metal oxide powders such as tungsten oxide powder are subjected to a sublimation step using plasma treatment or the like to produce tungsten oxide powder ($WO_3$). Further, in Patent Document 1, heat treatment is performed in an oxidizing atmosphere, in order to adjust the crystal structure of the obtained tungsten oxide powder. Such heat treatment allows tungsten oxide powder having a stabilized crystal structure to be obtained.

In this way, the crystal structure of the metal oxide powder used as an electrode material has been stabilized by performing the heat treatment in an oxidizing atmosphere. Further, storage characteristics (storability) are improved by stabilizing the crystal structure.

Meanwhile, in the case of using tungsten oxide powder subjected to heat treatment in an oxidizing atmosphere as an electrode material, as in Patent Document 1, no further improvement in storage characteristics was not seen.

Prior Art Document

Patent Document 1: International Publication No. WO 2013/146194

SUMMARY OF THE INVENTION

Problems to be Solved by the Invention

As a result of investigating why no improvement in storage characteristics can be seen, the inventor of the present application has found that this is because the resistivity of the metal oxide powder increases as the crystal structure is stabilized. The flowability of electricity is reduced in the metal oxide powder having increased resistivity. It was found that, when the flowability of electricity is reduced, characteristics as an electrode material are not improved any more.

The conduction mechanisms indicating the flowability of electricity of an electrode material are roughly classified into two types, which are band conduction and hopping conduction. In the conventional metal oxide powder, the crystal structure is stabilized, and therefore the flowability of electricity is controlled by the band conduction. Meanwhile, further improvement in characteristics cannot be achieved only by band conduction.

Means for Solving the Problems

As a solution to the problem, the present invention provides an electrode material having an average particle size of 50 μm or less and an activation energy $E_\alpha$ of 0.05 eV or less. Such an electrode material has hopping conduction characteristics at room temperature (25° C.). As a result, electron delivery can be efficiently carried out, and technical effects such as improvement in charge/discharge efficiency and increase in charge/discharge speed can be obtained. Therefore, in an electrode layer, a battery, and an electrochromic device that use the electrode material according to the embodiment, excellent operational effects can be obtained.

BRIEF DESCRIPTION OF THE DRAWINGS

FIG. 3 is a graph exemplifying the relationship between the heat treatment temperature in a nitrogen atmosphere and the carrier density of the tungsten oxide powders according to Examples 1 to 3 and Comparative Examples 1 and 2.

FIG. 4 is a formula representing the drift mobility of the nearest hopping.

FIG. 5 is a plan view schematically showing an electrode material powder.

DETAILED DESCRIPTION OF THE INVENTION

An electrode material according to an embodiment has an average particle size of 50 μm or less and an activation energy $E_\alpha$ of 0.05 eV or less.

When the average particle size of the electrode material is as large as over 50 μm, the surface area per unit is reduced, and the electron delivery efficiency is reduced. Therefore, the average particle size of the electrode material is preferably 50 μm or less, further preferably 10 μm or less.

Figures 1, 2:
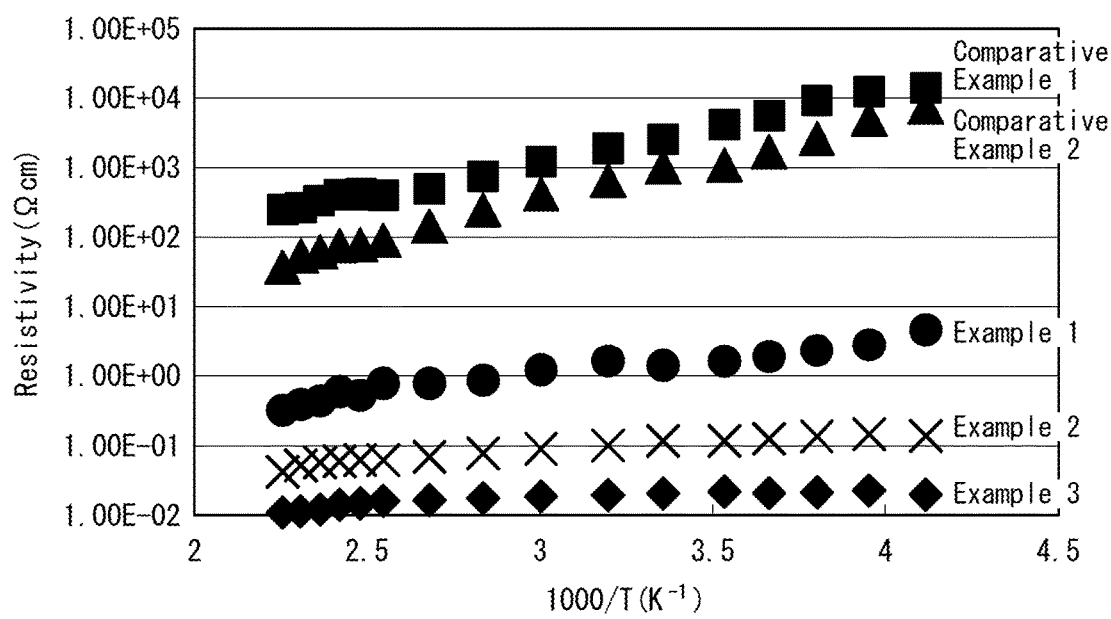
FIG. 1 is a formula representing a resistivity in which band conduction and hopping conduction are mixed.
FIG. 2 is a graph exemplifying the relationship between the measurement temperature and the resistivity of tungsten oxide powders according to Examples 1 to 3 and Comparative Examples 1 and 2.

Next, it is effective that the activation energy $E_\alpha$ of the electrode material is 0.05 eV or less. FIG. 1 shows a formula representing the resistivity in which band conduction and hopping conduction are mixed. In the formula, ρ represents the resistivity, q represents the elementary charge, N represents the number of sites, µ represents the mobility of carriers, k represents the Boltzmann constant, T represents the measurement temperature (unit Kelvin), $E_\alpha$ represents the activation energy by band conduction, and ε represents the activation energy by hopping conduction. Further, $\mu_b$ represents the mobility of carriers by band conduction, and $\mu_h$ represents the mobility of carriers by hopping conduction.

The electrode material according to the embodiment has an activation energy $E_\alpha$ of 0.05 eV or less. The activation energy $E_\alpha$ can be determined by the Arrhenius plot.

Further, the state where the activation energy $E_\alpha$ is 0.05 eV or less means that almost no band conduction characteristics exist. In other words, the electrode material has hopping conduction characteristics.

Hopping conduction herein means the state where, while almost all electrons are in a localized state in a semiconductor (or an ionic crystal) or the like, electric conduction is achieved by successive electronic jumping (hopping) from one localized state to another. In the hopping conduction, the mean free path of the electrons depends on the distance between atoms (in impurity conduction, the distance between impurity atoms), the electric conductivity is far lower than in the case of free electrons, and a contrasting behavior to free electrons having a long mean free path is shown. The jumping (hopping) process is assisted by thermal vibration of atoms. Further, the state where "almost all electrons are localized" means the state where the electrons existing in the conduction band exist around the energy minimum point of the conduction band.

Meanwhile, band conduction means the state where electric conduction is achieved while electrons (or holes) are present in a comparatively wide range (broad band region) in a semiconductor (or an ionic crystal) or the like. The electrons (or holes) are generated due to the deviation of the semiconductor (or the ionic crystal) from the stoichiometric composition.

In the electrode material according to this embodiment, almost all electrons are localized and hopping conduction characteristics are exhibited. By having the hopping conduction characteristics, the electrode material can have enhanced electron conduction. Further, the enhancement in electron conduction enables efficient delivery of ions and electrons and improves the reversibility as an electrode material, so that the charge/discharge efficiency can be improved and the charge/discharge speed can be increased.

Further, the electrode material preferably has oxygen defects or defects by impurity doping. In order to exhibit hopping conduction characteristics, it is necessary that "almost all electrons are localized", that is, electrons existing in the conduction band exist around the energy minimum point of the conduction band. To make such a state, it is necessary to cause lattice distortion by negatively charging the electrons. The electric polarization by the lattice distortion interacts with the electrons to reduce the energy of the electrons, and therefore the electrons of the electrode material are transferred by the electric polarization. Such composite particles of electrons and the lattice distortion with the electric polarization are called polarons.

Further, a large polaron refers to a polaron in which an extent of lattice distortion caused by an electron is larger than the crystal unit cell. In contrast, a small polaron refers to a polaron in which the extent of lattice distortion caused by an electron is smaller than the crystal unit cell.

In the case where the polaron moves by application of an electric field, the polaron needs to jump across the energy barrier from a site to the next site. For passing the energy barrier, there are two methods including the case where the polaron is thermally activated to jump across the energy barrier, and the case where the polaron passes through the energy barrier by the tunnel effect. Hopping conduction is mainly the case where the polaron is thermally activated to jump across the energy barrier. Since the polaron is thermally activated to jump across the energy barrier in hopping conduction, the polaron mainly jumps to the nearest site. Such jumping to the nearest site is called nearest hopping. Since the nearest hopping is jumping to the nearest site, the charge/discharge efficiency of electrons (or ions) is improved.

In order to give hopping conduction, oxygen defects or defects by impurity doping are preferably provided. As will be described below, oxygen defects can be given by heat treatment of the electrode material in a non-oxidizing atmosphere such as nitrogen. Further, the surface of the electrode material is doped in impurity doping. Heat treatment in a non-oxidizing atmosphere or doping is suitable for giving defects to the surface of the electrode material.

Forming defects on the surface of the electrode material allows the electrons (or ions) to easily transfer on the surface of the electrode material when the electrode material is formed into an electrode layer, so that storage or release of the electrons (or ions) can be accelerated. When the oxygen defects are compared with the defects by impurity doping, the oxygen defects allow easier control of the amount of defects. Also, oxygen defects allow superior mass productivity.

Further, it is preferable that the electrode material exhibits the hopping conduction at room temperature (25° C.=298 K). As will be described below, the electrode material according to the embodiment can be suitably applied to electrode layers, batteries, and electrochromic devices. The environment of these are used is mainly at room temperature (25° C.). Therefore, it is preferable to exhibit the hopping conduction at about room temperature. Further, the temperature may increase during use in some cases.

Therefore, it is preferable to exhibit the hopping conduction at 85° C. (358 K) or less, further 60° C. (333 K) or less.

FIG. 2 shows a graph exemplifying the relationship between the measurement temperature and the resistivity of the tungsten oxide powders. In FIG. 2, the horizontal axis represents 1000/T, where T represents the measurement temperature (unit Kelvin: K). Further, the vertical axis represents the resistivity, and the unit is Ωcm. FIG. 2 shows the examples of Examples 1 to 3 and Comparative Examples 1 and 2, which will be described below. Comparative Example 1 is a tungsten oxide powder that is not subjected to heat treatment in nitrogen, and Examples 1 to 3 and Comparative Example 2 are tungsten oxide powders subjected to heat treatment in nitrogen under conditions shown in Table 1.

TABLE 1

| Sample No. | Heat Treatment Codition in Nitrogen Gas |
|---|---|
| Example 1 | 600° C. × 5 min. |
| Example 2 | 700° C. × 5 min. |
| Example 3 | 750° C. × 5 min. |
| Comparative Example 1 | None |
| Comparative Example 2 | 300° C. × 5 min. |

As is obvious from the results shown in FIG. 2, Examples 1 to 3 undergo almost no change in resistivity in the region with 1000/T of 2.8 to 4.0. When the hopping conduction characteristics are given, such characteristics with substantially no change (almost no change) in resistivity are exhibited. As a result of measurement, all the tungsten oxide powders exhibiting such characteristics had an activation energy $E_\alpha$ of 0.05 eV or less. In other words, it can be said that the hopping conduction characteristics are given when the activation energy $E_\alpha$ is 0.05 eV or less.

Meanwhile, Comparative Examples 1 and 2 show positive slope graphs (diagrams). That is, the resistivity increases as the measurement temperature decreases. In band conduction, electrons (or holes) transfer in a broad band. The band conduction characteristics highly depend on the temperature. Therefore, in Comparative Examples 1 and 2, the resistivity continuously decreases as the measurement temperature increases (the value of 1000/T decreases). As a result of measurement, the tungsten oxide powders of Comparative Examples 1 and 2 both had an activation energy $E_\alpha$ of over 0.05 eV.

1000/T=2.8 is at 357 K (84° C.), and 1000/T=4.0 is at 250 K (−23° C.). That is, the tungsten oxide powders according to Examples 1 to 3 exhibit the hopping conduction characteristics in the temperature range of −23 to 84° C.

Here, the electrode material is used as an electrode material of products such as batteries and electrochromic devices. The temperature of the environment in which these products are used is in the range of about −23 to 84° C. Therefore, the charge/discharge characteristics of such products using the electrode material having hopping conduction characteristics at room temperature (25° C.), further −23 to 84° C., do not depend on the temperature. Therefore, the charge/discharge characteristics of the products such as batteries and electroluminescence devices can be maintained, in an environment at −23 to 84° C. in which they are used. Accordingly, the characteristics of these products can be improved. The electrode material according to the embodiment can be suitably used for both hopping conduction and band conduction in the range with 1000/T of less than 2.8 or over 4.0.

Further, the resistivity with the 1000/T value (T herein is temperature (unit: Kelvin)) in the range of 2.8 to 4.0 is preferably 10 Ωcm or less. As seen from Comparative Example 1 in FIG. 2, the resistivity at room temperature of the tungsten oxide powder that is not subjected to the heat treatment in nitrogen is $10^3$ Ωcm or more.

Generally, the resistivity of metal oxides is $10^2$ Ωcm or more. When hopping conduction characteristics are exhibited and the resistivity is 10 Ωcm or less, the electrons (or ions) can be stored or released efficiently. The electrode material according to the embodiment has a resistivity of 10 Ωcm or less at room temperature (25° C.) and exhibits hopping conduction characteristics.

When the electrode material has a low resistivity of 10 Ωcm or less, the internal resistance of the electrode material (or an electrode layer using the electrode material) can be reduced. When the internal resistance is reduced, the capacitance can be increased. For example, when the internal resistance is reduced in use as an electrode layer of a capacitor, the initial capacitance can be increased. Further, the capacity retention in a cycle test can be enhanced. As a result of this, the capacitor having an extended life (long life) can be realized.

Further, the amount of defects is preferably $1\times10^{18}$ cm$^{-3}$ or more, further preferably $1\times10^{19}$ cm$^{-3}$ or more. Further, defects are preferably oxygen defects. Therefore, the amount of oxygen defects is preferably $1\times10^{18}$ cm$^{-3}$ or more, further preferably $1\times10^{19}$ cm$^{-3}$ or more.

Further, the carrier density is preferably $1\times10^{18}$ cm$^{-3}$ or more, further preferably $1\times10^{19}$ cm$^{-3}$ or more.

Here, the oxygen defects mean the state where, in a crystal lattice of a material constituting the electrode material, some of oxygen atoms constituting the crystal lattice do not exist. The carrier density means the amount of electrons or holes serving as carriers, that are present. The carriers are holes in a p-type semiconductor, and the carriers are electrons in an n-type semiconductor. The carrier density can be determined as a product of the state density and the Fermi-Dirac distribution function.

While the oxygen defects indicate the amount of missing oxygen atoms in the crystal lattice, the carrier density indicates the amount of electrons (or holes) present. The oxygen defects and the carrier density are different parameters from each other. When the hopping conduction is exhibited, lattice distortion due to the oxygen defects and conduction electrons form polarons. A conduction mechanism is generated by the polarons. Therefore, the amount of oxygen defects and the carrier density can be almost the same values when the hopping conduction characteristics are exhibited. In other words, controlling the amount of oxygen defects enables control of the characteristics of the electrode material.

Further, the carrier mobility (unit: cm$^2$/Vs) is preferably set to 0.01 cm$^2$/Vs or more.

FIG. 4 shows a formula representing the drift mobility in the nearest hopping. In the formula, $\mu_H$ represents the drift mobility, $\alpha^{-1}$ represents the spatial spread of donor levels, $R_H$ represents the distance between the donors, $V_{ph}$ represents the phonon scattering probability, $W_H$ represents the activation energy, k represents the Boltzmann constant, T represents the temperature (unit Kelvin), and q represents the elementary charge.

As is obvious from the formula shown in FIG. 4, in order to increase the drift mobility $\mu_H$ (to accelerate the transfer of electrons), either one or two or more of reducing $R_H$, reducing $W_H$, and increasing kT are preferably satisfied. For reducing $R_H$, it is effective to increase the amount of defects. By increasing the amount of defects, the distance between the defects (donors) can be reduced. Further, it is effective to increase the amount of defects also for reducing $W_H$. By increasing the amount of defects, the resistance of the electrode material can be reduced. Further, for increasing kT, the measurement temperature is increased. It is found that increasing the amount of defects is effective for increasing the drift mobility. That is, accelerating the transfer of electrons. In particular, such a tendency is strong in tungsten oxide.

The activation energy $W_H$ is preferably as low as 0.20 eV or less, further preferably 0.10 eV or less, as compared with that of an electrode material having no defects. For example, when $W_H$ of a tungsten oxide powder produced by plasma treatment from which defects are eliminated by heat treating the tungsten oxide powder in atmospheric air, as in Comparative Example 1, is 0.19 eV, the amount of defects is preferably controlled so that $W_H$ is reduced to 0.10 eV or less. The activation energy $W_H$ is measured by the Arrhenius plot.

The electrode material according to the embodiment may have band conduction characteristics as long as it has the hopping conduction characteristics. In particular, the hopping conduction characteristics are preferably dominant. When the hopping conduction characteristics are dominant, the following characteristics can be obtained: the activation energy $E_\alpha$ is 0.05 eV or less and the resistivity almost does not change in a constant temperature range.

Further, the material of the electrode material according to the embodiment is not specifically limited as long as the electrode material has the hopping conduction characteristics. The electrode material is preferably a metal compound powder or a carbon powder. These materials are advantageous in that the activation energy is easily controlled using the amount of defects.

Further, the metal compound is preferably at least one selected from tungsten oxide, molybdenum oxide, titanium oxide, lithium tungstate, lithium molybdate, lithium titanate, and molybdenum sulfide. These materials are easily formed into a semiconductor. When they are formed into a semiconductor, the hopping conduction characteristics are easily given.

Specific examples of these metal compounds include:
(1) Tungsten oxide: $WO_{3-x}$, where $0 \leq x \leq 1$,
(2) Molybdenum oxide: $MoO_{3-x}$, where $0 \leq x \leq 1$,
(3) Titanium oxide: $TiO_{2-x}$, where $0 \leq x \leq 1$,
(4) $Mo_xW_yO_z$, where $0<x \leq 1$, $0<y \leq 1$, and $x+y=1$, $2 \leq z \leq 3$,
(5) $W_xTi_yO_z$, where $0<x \leq 1$, $0<y \leq 1$, and $x+y=1$, $2 \leq z \leq 3$,
(6) $Mo_xTi_yO_z$, where $0<x \leq 1$, $0<y \leq 1$, and $x+y=1$, $2 \leq z \leq 3$,
(7) $Mo_xW_yO_zTi_\alpha$, where $0<x \leq 1$, $0<y \leq 1$, $0<\alpha \leq 1$, and $x+y+\alpha=1$, $2 \leq z \leq 3$,
(8) Lithium tungstate: $Li_xW_yO_{3-z}$, where $0<x \leq 1$, $0<y \leq 1$, and $0 \leq z \leq 1$,
(9) Lithium molybdate: $Li_xMo_yO_{3-z}$, where $0<x \leq 1$, $0<y \leq 1$, and $0 \leq z \leq 1$,
(10) Lithium titanate: $Li_xTi_yO_{3-z}$, where $0<x \leq 1$, $0<y \leq 1$, and $0 \leq z \leq 1$, and
(11) Molybdenum sulfide: $MoS_{2-x}$, where $0<x \leq 1$.

As described above, metal oxides and metal composite oxides have oxygen as a constituent element, and therefore oxygen defects are easily formed. As a result, the hopping conduction characteristics are easily given. Further, when x, y, z, and a exceed the respective ranges, chemical instability is caused, resulting in a reduction in capacity to store electrons. Further, the hopping conduction characteristics can be given by either method of oxygen defects or impurity doping.

Since the electrode material as described above further has the hopping conduction characteristics in addition to having a reduced resistance, the capacity to store or release electrons can be increased. Further, the charge/discharge efficiency also can be improved. Further, the capacity retention after the cycle test also can be increased. Therefore, the battery life also can be extended. Further, the temperature dependence also can be eliminated, owing to the hopping conduction characteristics. Therefore, the temperature dependence of products using the electrode material also can be eliminated.

The electrode material according to the embodiment is effectively applied any one of electrode layers, batteries, and materials for electrochromic devices.

Further, in the case of using the electrode material as an electrode layer, the content of the electrode material according to the embodiment is preferably 50 mass % or more and 100 mass % or less. When the ratio of the electrode material according to the embodiment in the electrode layer is as low as less than 50 mass %, the effect of improving the characteristics may be insufficient.

Further, the electrode layer according to the embodiment is formed by layering the electrode material according to the embodiment (to which 50 mass % or less of other components are added, as needed). Therefore, in the case where a surface coating layer, a base layer (under-coat layer), and the like are separately formed, they do not account for the electrode layer. Accordingly, when mass % of the electrode material in the electrode layer is determined, the calculation is performed using the region in which the electrode material according to the embodiment (to which only less than 50 mass % of other components are added, as needed) is layered.

The electrode layer according to the embodiment is suitable as a constituent material of batteries. Examples of the batteries include chargeable/dischargeable batteries such as lithium ion secondary batteries, capacitors, and condensers. Further, the electrode layer formed by layering the electrode material is preferably used as the anode. The anode is particularly suitable because electrons (or ions) are delivered therein.

Further, in order to make use of high capacity and good charge/discharge efficiency, use for a capacitor is preferable. The capacitor using the electrode material of the embodiment can have a power density of 1000 W/kg or more, further 3000 W/kg or more. Further, Li ions contained in the electrolyte solution can be delivered in a large amount. Further, the cyclability (cyclic property) can be improved by increasing the ratio of the electrode material according to the embodiment in the electrode layer. The improvement in cyclability can extend the battery life as well. The thickness of the electrode layer is not specifically limited but is preferably 1 to 100 μm.

Further, it is also effective to use the electrode material of this embodiment as a material for electrochromic devices. The material for electrochromic devices is a material having optical characteristics in which a reversible change is observed when an electric charge is applied. Therefore, it is used for display devices such as electronic books and displays. Since the capacity to store or release electrons is increased, the reversible change in optical characteristics can be clearly performed. Further, since the efficiency of electron delivery is enhanced, black and white reversal can be accelerated.

Next, a method for producing the electrode material according to the embodiment will be described hereunder. The method for producing the electrode material according to the embodiment is not specifically limited as long as the electrode material has an average particle size of 50 μm or less and an activation energy $E_\alpha$ of 0.05 eV or less, but examples of the production method with high efficiency include the following method.

First, a raw material powder of the electrode material is prepared. As the raw material powder, a metal compound powder is prepared when the electrode material is a metal compound, and a carbon powder is prepared when the electrode material is a carbon. As the metal compound powder, a metal oxide powder (including a metal composite oxide) or a metal sulfide powder is prepared. As the metal oxide powder, metal oxide powders or metal composite oxide powders described above in (1) to (10) are preferable. Further, the metal sulfide is preferably molybdenum sulfide powder.

The average particle size of the electrode material powder is preferably 50 μm or less, further preferably 10 μm or less. Further preferably, the average particle size is 5 μm or less. The smaller the average particle size, the easier it is to impart (give) defects. Further, the smaller the average particle size, the more the surface area per unit volume can be increased, thus being advantageous. The increase in surface area leads to an increase in the region in which electrons (or ions) are delivered, and therefore can improve the storage capacity.

Further, examples of a method for producing a powder having small particle size include a method using a sublimation process. Further, the sublimation process is preferably any one of plasma treatment, arc discharge treatment, laser treatment, and electron beam treatment. As the plasma treatment, inductively coupled plasma treatment is preferable. The inductively coupled plasma treatment is advantageous in that a metal compound powder having an average particle size of 50 μm or less, further 10 μm or less, is easily obtained by using plasma flame. Further, in the production of the metal oxide powder (including a metal composite oxide), the sublimation process (step) is performed in an oxygen-containing atmosphere. Further, in the production of the metal sulfide powder, the sublimation process is performed in a sulfur-containing atmosphere.

Further, a heat treatment may be performed in an oxygen-containing atmosphere on the metal oxide powder obtained after the sublimation process. Examples of the oxygen-containing atmosphere include atmospheric air. Further, a heat treatment may be performed in a sulfur-containing atmosphere on the metal sulfide powder obtained after the sublimation process. A metal compound powder free from defects can be produced by performing the heat treatment in an oxygen-containing atmosphere or a sulfur-containing atmosphere after the sublimation process. By performing such a step, the amount of defects is easily controlled in a step of providing defects.

Further, the description has been given herein under the assumption that the heat treatment step is performed after the sublimation step, but heat treatment may be performed on a metal compound powder produced by a production method other than the sublimation step.

Next, a step of providing defects is performed on the raw material powder of the electrode material. The step of providing defects is preferably a step of giving defects by oxygen defects or impurity doping.

In order to provide oxygen defects, it is effective to subject the raw material powder to heat treatment in a non-oxidizing atmosphere. Examples of the non-oxidizing atmosphere include an inert atmosphere such as nitrogen and argon, and a reducing atmosphere such as hydrogen. Further, a heat treatment in a nitrogen atmosphere and a mixed gas atmosphere with hydrogen may be also used. As the inert gas, heat treatment in a nitrogen atmosphere is preferable. The nitrogen gas has a merit in cost, since it is inexpensive as compared with argon gas and hydrogen gas.

Further, a heat treatment in a non-oxidizing atmosphere is preferably performed at 530° C. or more. When the temperature is regulated to 530° C. or more, the amount of oxygen defects can be set to $1\times10^{18}$ cm$^{-3}$ or more. Further, when the heat treatment temperature is less than 530° C., the amount of oxygen defects tends to be small, and the hopping conduction characteristics are not sufficiently obtained. Further, the heat treatment time is preferably 1 minute or more.

Further, the upper limit of the heat treatment time is preferably 60 minutes or less. When the heat treatment is applied for a long period of time over 60 minutes, the oxygen defects excessively increase, and the amount of oxygen in the metal oxide powder excessively decreases. The excessive decrease of oxygen in the metal oxide powder causes chemical instability, resulting in a reduction in capacity to store electrons. Further, long-term heat treatment is accompanied by particle growth (grain growth), and therefore the average particle size may possibly exceed 10 μm. The heat treatment time is preferably in the range of 1 to 60 minutes, further preferably 3 to 20 minutes. Further, as the non-oxidizing atmosphere, a reducing atmosphere such as a hydrogen atmosphere may be used.

Other than the aforementioned method, a method for forming defects by impurity doping can also be applied.

EXAMPLES

Examples 1 to 3 and Comparative Examples 1 and 2

As a raw material powder, a tungsten oxide powder having an average particle size of 1.5 μm was prepared. The raw material powder was sprayed to inductively coupled plasma flame using air as a carrier gas at an average flow rate of 1.5 m/s, to obtain a tungsten oxide ($WO_3$) powder by a sublimation step of performing an oxidation reaction while sublimating the raw material powder. Thus obtained tungsten oxide ($WO_3$) powder had an average particle size of 8.2 nm (0.008 μm).

Thereafter, a heat treatment at a temperature of 450° C. for 50 hours was performed thereon in atmospheric air, to produce a monoclinic $WO_3$ powder. The obtained $WO_3$ powder had an average particle size of 25 nm. The $WO_3$ powder obtained by this step served as Comparative Example 1. The $WO_3$ of Comparative Example 1 was subjected to heat treatment in nitrogen under conditions shown in Table 2. Via such heat treatment step, tungsten oxide powders according to Examples 1 to 3 and Comparative Example 2 were prepared.

TABLE 2

| Sample No. | Heat Treatment Condition in Nitrogen Gas |
|---|---|
| Example 1 | 600° C. × 5 min. |
| Example 2 | 700° C. × 5 min. |
| Example 3 | 750° C. × 5 min. |
| Comparative Example 1 | None |
| Comparative Example 2 | 300° C. × 5 min. |

For the resultant tungsten oxide powders, the composition and the average particle size were measured. The composition (oxygen defects) of the tungsten oxide powders was analyzed using a $KMnO_4$ solution by quantitating the amount of $KMnO_4$ required to oxidize all W ($W^{4+}$ and $W^{5+}$) ions with a lower electric charge to form $W^{6+}$ by chemical analysis. By this analysis, substitution with $WO_{3-x}$ was performed to determine the x value. The x value was taken as the amount of oxygen defects.

Figure 6:
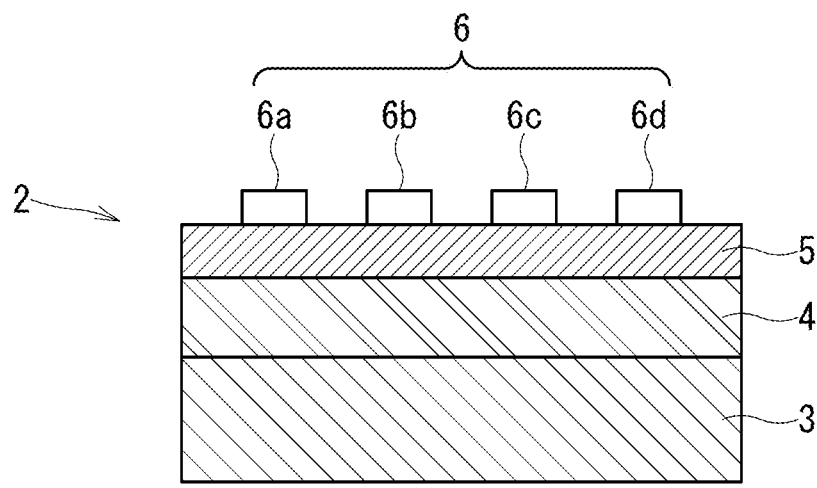
FIG. 6 is a sectional view showing the structure of a sample for which the relationship between the measurement temperature and the resistivity is measured.

Further, the particle size was converted from BET specific surface area measurement. Further, the activation energy $E_\alpha$ (eV) was measured. The activation energy $E_\alpha$ was determined by the Arrhenius plot of the measurement temperature and the resistivity. FIG. 6 shows a structure of a measurement sample used for the measurement of the relationship between the measurement temperature and the resistivity. In FIG. 6, reference numeral 2 denotes the measurement sample, reference numeral 3 denotes an n-Si substrate, reference numeral 4 denotes a $SiO_2$ layer, reference numeral 5 denotes an electrode layer composed of a tungsten oxide powder of Examples (or Comparative Examples), and reference numeral 6 denotes metal electrodes. The $SiO_2$ layer 4 has a thickness of 400 nm, the electrode layer 5 composed of the tungsten oxide powder has a thickness of 100 nm, and the metal electrode layers 6 (6a, 6b, 6c, and 6d) are made of metal tungsten and have a thickness of 50 nm (diameter 200 µm).

In the measurement of the resistivity, the voltage and the current applied to the metal electrode 6a were referred to as $V_1$ and $I_1$. The metal electrode 6b was used as a measurement terminal, where the detection voltage was referred to as $V_2$, and the detection current was referred to as $I_2$. Further, the metal electrode 6c was also used as a measurement terminal, where the detection voltage was referred to as $V_3$, and the detection current was referred to as $I_3$. Further, the voltage and the current applied to the metal electrode 6d were referred to as $V_4$ and $I_4$. The voltage $V_1$ and the current $I_1$ were applied between the metal electrodes 6a and 6d. The resistance difference (($V_2-V_3)/I_1$ (unit ohm Ω)) with respect to the voltage difference ($V_2-V_3$ (unit volt V)) between the metal electrodes 6b and 6c serving as measurement terminals was investigated. The electrode layer 5 composed of the tungsten oxide powder having the resistance difference (($V_2-V_3)/I_1$) was formed. In the measurement, the voltage $V_1$ was varied from −15 to +15 V. Table 3 and FIG. 2 show the measurement results.

TABLE 3

| Sample No. | Composition ($WO_{3-x}$) x Value | Average Particle Size (nm) | Activation Energy $E_\alpha$ (eV) |
|---|---|---|---|
| Example 1 | 0.015 | 27 | 0.04 |
| Example 2 | 0.047 | 28 | 0.03 |
| Example 3 | 0.078 | 28 | 0.02 |
| Comparative Example 1 | 0.001 | 25 | 0.19 |
| Comparative Example 2 | 0.002 | 25 | 0.23 |

As is obvious from the results shown in Table 3 above, the x value of the tungsten oxide powders according to Examples 1 to 3 was 0.015 or more.

Further, as is obvious from the results shown in FIG. 2, the tungsten oxide powders according to Examples 1 to 3 underwent almost no change in resistivity in the region with 1000/T of 2.8 to 4.0. As a result of this, it was found that the hopping conduction characteristics are dominant in the tungsten oxide powders according to Examples 1 to 3.

Meanwhile, the tungsten oxide powders according to Comparative Examples 1 and 2 show a positive slope graph (diagram). That is, the resistivity increases as the measurement temperature decreases. Since electrons (or holes) transfer in a broad band in band conduction, the temperature dependence is high. Therefore, it is found that the band conduction is dominant in the tungsten oxide powders of Comparative Examples 1 and 2.

As shown in FIG. 3, the carrier density (cm$^{-3}$) of the tungsten oxide powders according to Examples 1 to 3 and Comparative Example 2 was measured. The carrier density was measured as a product of the state density and the Fermi-Dirac distribution function. It was found that the tungsten oxide powders according to Examples had a carrier density of $1 \times 10^{18}$ cm$^{-3}$ or more. In contrast, the tungsten oxide powder according to Comparative Example 2 had a carrier density of $1 \times 10^{16}$ cm$^{-3}$ or less. Therefore, it was found that, the carrier density of the tungsten oxide powders according to Examples increased with the increase in the amount of defects.

Example 4

A tungsten oxide powder having an average particle size of 2.0 µm was prepared as a raw material powder. The raw material powder was sprayed to inductively coupled plasma flame using air as a carrier gas at an average flow rate of 1.2 m/s, to obtain a tungsten oxide ($WO_3$) powder by a sublimation step of performing an oxidation reaction while sublimating the raw material powder. The obtained tungsten oxide ($WO_3$) powder had an average particle size of 12.1 nm (0.0012 µm).

Thereafter, heat treatment at a temperature of 450° C. for 50 hours was performed thereon in atmospheric air, to produce a monoclinic $WO_3$ powder. Thus obtained $WO_3$ powder had an average particle size of 27 nm.

The $WO_3$ powder obtained by the heat treatment step was subjected to heat treatment at a temperature of 650° C. in a nitrogen atmosphere. The heat treatment time was set to 0 minutes, 30 seconds, 1 minute, 3 minutes, 5 minutes, 8 minutes, 10 minutes, 20 minutes, and 30 minutes. The tungsten oxide powder after the heat treatment had an average particle size of 5 µm or less.

For each sample, the resistivity at 1000/T was investigated, and it was found that samples subjected to heat treatment for 1 minute or more exhibit hopping conduction characteristics. That is, there was almost no change in resistivity in the region with 1000/T of 2.8 to 4.0.

Further, the resistivity of all the $WO_3$ powders subjected to heat treatment in the region with 1000/T of 2.8 to 4.0 for 1 minute or more was 10 Ωcm or less. Further, the carrier density (cm$^{-3}$) was also measured. Table 4 below shows the measurement results.

TABLE 4

| Sample No. | Time of Heat Treatment in Nitrogen Atmosphere at Temperature of 650° C. | Hopping Conduction Characteristics | Resistivity at Region where 1000/T is 2.8 to 4.0 (Ωcm) | Carrier Density (cm$^{-3}$) | Activation Energy (eV) |
|---|---|---|---|---|---|
| Sample 1 | 0 min. | None | $10^3$ or more | $10^{16}$ | 0.19 |
| Sample 2 | 30 sec. | None | 13 | $10^{16}$ | 0.15 |
| sample 3 | 1 min. | Obserbed | 10 or less | $10^{18}$ | 0.05 |
| Sample 4 | 3 min. | Obserbed | 10 or less | $10^{18}$ | 0.05 |
| sample 5 | 5 min. | Obserbed | 10 or less | $10^{18}$ | 0.04 |
| Sample 6 | 8 min. | Obserbed | 10 or less | $10^{18}$ | 0.04 |
| Sample 7 | 10 min. | Obserbed | 10 or less | $10^{19}$ | 0.04 |
| Sample 8 | 20 min. | Obserbed | 10 or less | $10^{19}$ | 0.03 |
| Sample 9 | 30 min. | Obserbed | 10 or less | $10^{19}$ | 0.03 |

Figure 7:
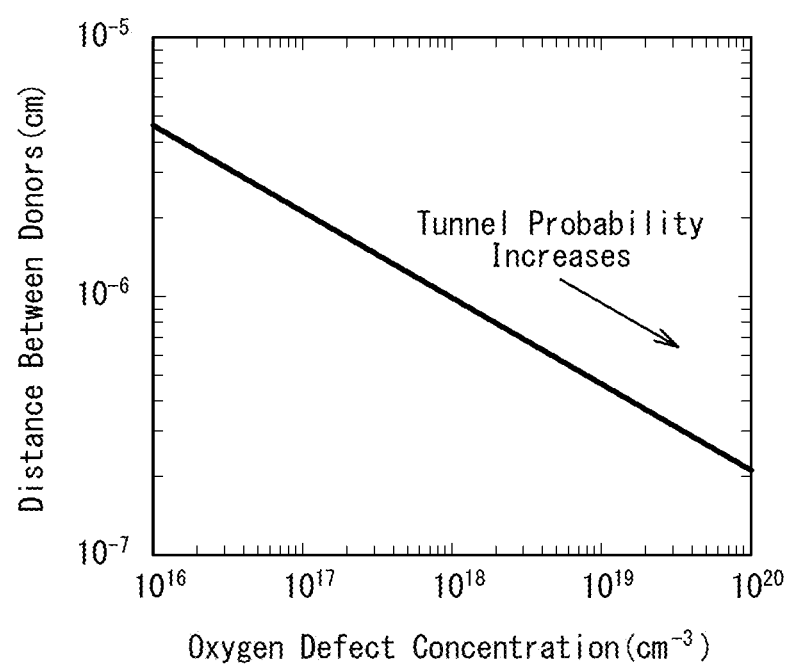
FIG. 7 is a graph exemplifying the relationship between the distance between donors (RH) and the oxygen defect (deficiency) concentration ($cm^{-3}$).

Further, the distance between donors ($R_H$) of the tungsten oxide powders according to samples 1 to 9 was measured. FIG. 7 shows the measurement results. As is obvious from the results shown in FIG. 7, it was found that the distance between donors, that is, the distance between oxygen defects is reduced (shortened) as the carrier density increases.

Further, it is obvious that, when the carrier density is $1\times10^{18}$ cm$^{-3}$ or more, the activation energy $E_\alpha$ is 0.05 eV or less. Therefore, it can be understood that the amount of oxygen defects and the carrier density are almost coincident with each other.

Examples 1A to 3A and Comparative Examples 1A and 2A

Figure 8:
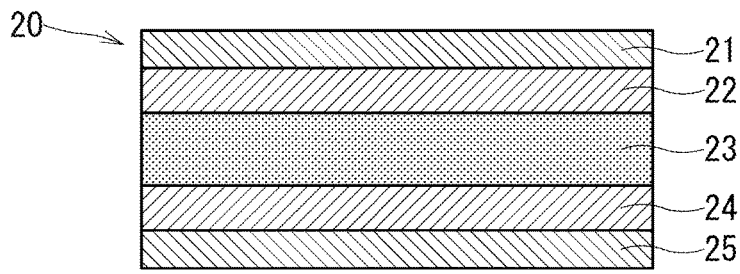
FIG. 8 is a sectional view showing the configuration of a capacitor according to an embodiment.

Using the tungsten oxide powders according to Examples 1 to 3 and Comparative Examples 1 and 2, capacitors were produced. FIG. 8 shows the configuration of the capacitors. In FIG. 8, reference numeral 20 denotes a capacitor, reference numeral 21 denotes an anode-side electrode layer, reference numeral 22 denotes an anode layer, reference numeral 23 denotes a separator layer, reference numeral 24 denotes a cathode layer, and reference numeral 25 denotes a cathode-side electrode layer. The anode-side electrode layer 21 and the cathode-side electrode layer 25 are composed of aluminum foils having a thickness of 15 μm.

Next, the tungsten oxide powder according to Examples or Comparative Examples, acetylene black as a conduction aid, and PVDF as a binder were mixed to prepare a paste. This paste was applied onto the anode-side electrode layer 21, followed by drying, thereby to produce the anode layer 22. Next, using LiCoO$_2$ powder as a cathode material, a paste was produced in the same manner as in the aforementioned anode, and the paste was applied onto the cathode-side electrode layer 25, followed by drying, thereby to produce the cathode layer 24. The anode layer 22 and the cathode layer 24 each had an electrode area of 2 cm$^2$.

Further, the mixing ratio (mass ratio) of the tungsten oxide powder and the acetylene black was set to tungsten oxide powder: acetylene black=100:10. Further, the unit weight of the anode material in the total of the tungsten oxide powder and the acetylene black was adjusted to 10 mg/cm$^2$, and the formation was such that the film thickness after drying was 20 μm, and the porosity was 50%. Further, the cathode material was provided in a unit weight with sufficient margin with respect to the capacitance of the anode material.

Further, as the separator layer 23, a polyethylene porous film (film thickness: 20 μm) was used. A stack of these electrodes and the separator layer was integrated into a cell made of aluminum, which was impregnated with an electrolyte solution, followed by defoaming and sealing, thereby to produce a capacitor (battery). As the electrolyte solution, a solution obtained by dissolving LiPF$_6$ as an electrolyte in an EC/DEC solution was used. EC is an abbreviation of Ethylene Carbonate, and DEC is an abbreviation of Diethyl Carbonate.

Using the aforementioned capacitor, the charge/discharge characteristics were investigated. First, in order to measure the capacitance, a charge/discharge test in a voltage range from 1.0 V to 2.0 V was conducted using a charge/discharge device. Charging was first performed in a constant current mode and was switched upon reaching 2.0 V to a constant voltage mode at 2.0 V, and the charging was continued until the amount of current was reduced to a constant value. After completion of the charging, discharging was performed at a constant current, and the capacitance of the capacitor was determined from the capacitance during the discharging. A value of the capacitance per one gram (mAh/g) of the anode material was determined as the initial capacitance.

Next, the internal resistance was measured by a direct current method. Discharging at a constant current was performed under conditions in which the amount of current was varied between two levels of 1 mA/cm$^2$ or 5 mA/cm$^2$, and the internal resistance (Ω·cm$^2$) was determined from the relationship between the discharge start voltages and the amounts of load current.

Further, in order to investigate the charge/discharge cyclability of the capacitor, a charge/discharge test like the aforementioned method for measuring the capacitance was repeated 1000 times, thereby to evaluate the retention of the capacity. The capacitance after repeating the charge/discharge cycle of 1000 times was compared with the initial capacitance, thereby to determine the capacity retention after the cycle test. The capacity retention after the cycle test was determined by (capacitance after cycle test/initial capacitance)×100(%).

Table 5 below shows the initial capacitance, the capacity retention after the cycle test, and the internal resistance value.

TABLE 5

| Sample No. | Electrode Material for Battery | Initial Capacitance (mAh/g) | Capacity Retention after Cycle Test (%) | Internal Resistance Value (Ω·cm$^2$) |
|---|---|---|---|---|
| Example 1A | Example 1 | 63.3 | 83.9 | 10.2 |
| Example 2A | Example 2 | 65.4 | 83.3 | 9.9 |
| Example 3A | Example 3 | 66.9 | 83.9 | 9 |
| Comparative Example 1A | Comparative Example 1 | 55.2 | 73.1 | 16.2 |
| Comparative Example 2A | Comparative Example 2 | 60.3 | 80.9 | 13.7 |

As is obvious from the results shown in Table 5 above, since the internal resistance of the capacitor using the metal oxide powder according to each embodiment was reduced, the initial capacitance thereof was high. Further, the capacity retention after the cycle test was also high.

Further, the power density of the capacitor according to Examples 1A to 3A and Comparative Examples 1A and 2A was determined. The power density (W/kg) was determined from a calculation formula, $0.25\times(V_2-V_1)/R/cell$ weight. The $V_2$ represents the discharge start voltage, $V_1$ represents the discharge end voltage, and R represents the cell resistance (cell electrode area: 2903 cm$^2$). The calculation was performed with a cell weight of 120 g. The measurement temperature was varied in three ways of −15° C., +25° C., and +60° C. Table 6 below shows the measurement results.

TABLE 6

| | Power Density (W/kg) | | |
|---|---|---|---|
| Sample No. | −15° C. | 25° C. | 60° C. |
| Example 1A | 2388 | 2385 | 2376 |
| Example 2A | 2459 | 2457 | 2454 |
| Example 3A | 2710 | 2702 | 2700 |
| Comparative Example 1A | 1428 | 1376 | 1189 |
| Comparative Example 2A | 1974 | 1775 | 1463 |

As is obvious from the results shown in Table 6 above, the temperature dependence of the power density was reduced in the capacitor according to Examples. Therefore, it was found that the capacitor using the tungsten oxide powder of each Example has high electrical characteristics, even in the case where the environment in which it was used changed.

Next, using the capacitors of Examples 1A to 3A and Comparative Examples 1A and 2A, the charge/discharge efficiency was measured. The charge/discharge efficiency was calculated by performing both charging and discharging at a constant current, changing the discharge conditions without changing the charge conditions, and determining the ratio of the storage capacity (mAh) during charging and the storage capacity (mAh) during discharging. The rate (C) is expressed in units of the electrical quantity that reaches the theoretical capacity in 1 hour. The higher the capacitance ratio, the faster the charging/discharging can be performed. Table 7 below shows the measurement results.

TABLE 7

| Sample No. | Capacitance Ratio with respect to Rate (C) | | | | |
|---|---|---|---|---|---|
| | 1 | 2 | 3 | 4 | 5 |
| Example 1A | 0.78 | 0.66 | 0.60 | 0.54 | 0.48 |
| Example 2A | 0.82 | 0.69 | 0.63 | 0.56 | 0.50 |
| Example 3A | 0.84 | 0.71 | 0.65 | 0.58 | 0.52 |
| Comparative Example 1A | 0.56 | 0.43 | 0.37 | 0.30 | 0.24 |
| Comparative Example 2A | 0.67 | 0.57 | 0.52 | 0.47 | 0.42 |

Figure 9:
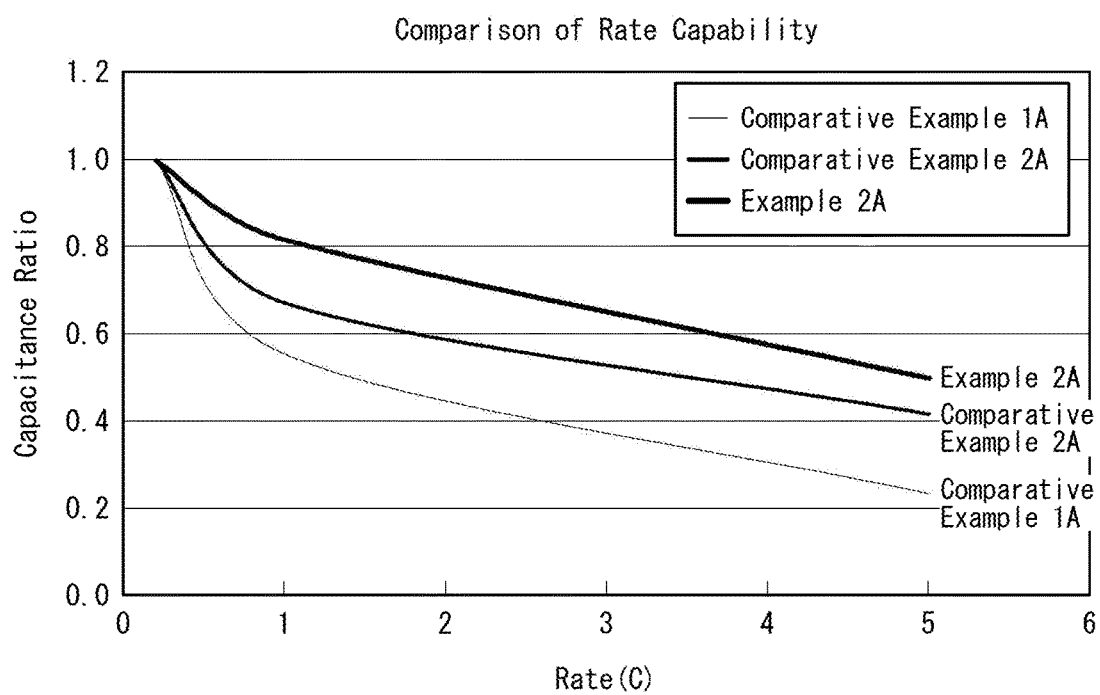
FIG. 9 is a graph showing the charge/discharge characteristics of electrode layers using the tungsten oxide powders (electrode materials) of Example 2 and Comparative Examples 1 and 2.

Further, FIG. 9 shows the comparison of the rate capability of Example 2A and Comparative Examples 1A and 2A. In FIG. 9, the horizontal axis represents the rate (C), and the vertical axis represents the capacitance ratio. As is obvious from the results shown in FIG. 9, the capacitor according to Example 2A has a high capacitance ratio. This indicates that the electrical quantity stored can be transformed into the electrical quantity to be discharged. This is because the tungsten oxide powder (electrode material) according to each Example has the hopping conduction characteristics.

Figure 10:
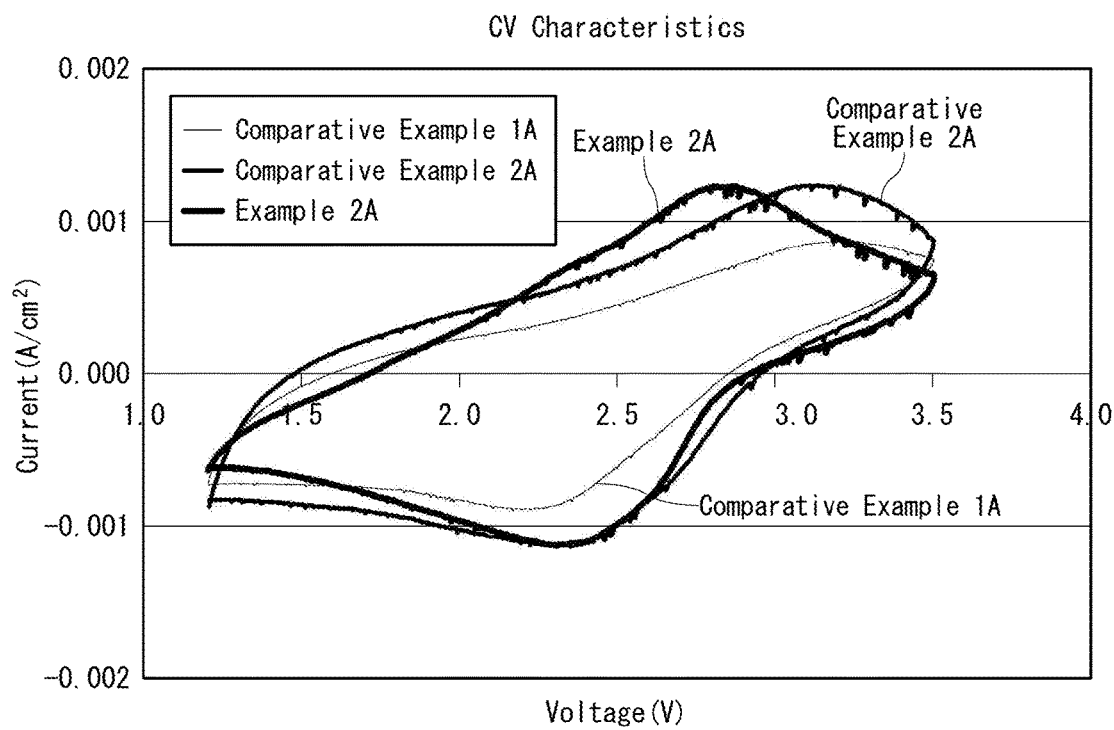
FIG. 10 is a graph showing the voltammogram of electrode layers using the tungsten oxide powders (electrode materials) of Example 2 and Comparative Examples 1 and 2.

Next, the voltammogram of the capacitors according to Example 2A and Comparative Examples 1A and 2A was investigated. FIG. 10 shows the results.

The voltammogram shows the applied potential on the horizontal axis and the response current value on the vertical axis. When the potential is swept in the negative direction, a reduction wave (upper side) occurs. Further, when the potential is swept in the positive direction, an oxidation wave (lower side) occurs. The voltammogram is intended to measure the response current in an oxidation/reduction reaction accompanied by the transfer of electrons. When the potential is swept in the positive direction, the charge current flows, and when the potential is swept in the negative direction, the discharging current flows, where intercalation is activated most at the peak voltage. The closer the peak values of charging and discharging (potential difference), the higher the reaction reversibility, whereby a high-speed charging/discharging is enabled.

As is obvious from the results shown in FIG. 10, it is found that, in Example, the potential difference between the peaks is small, and high-speed charging/discharging can be achieved, as compared with Comparative Examples.

Figure 11:
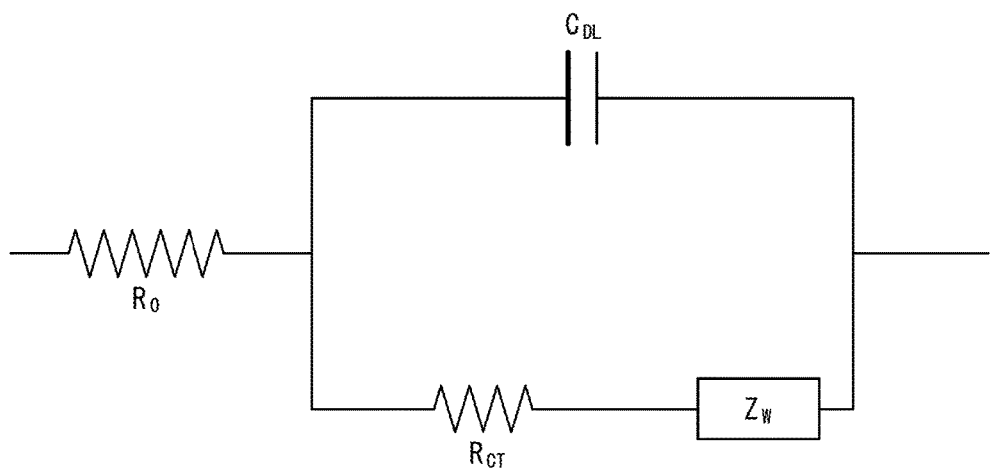
FIG. 11 is a diagram showing an equivalent circuit for measuring the impedance by the AC impedance method.
Figure 12:
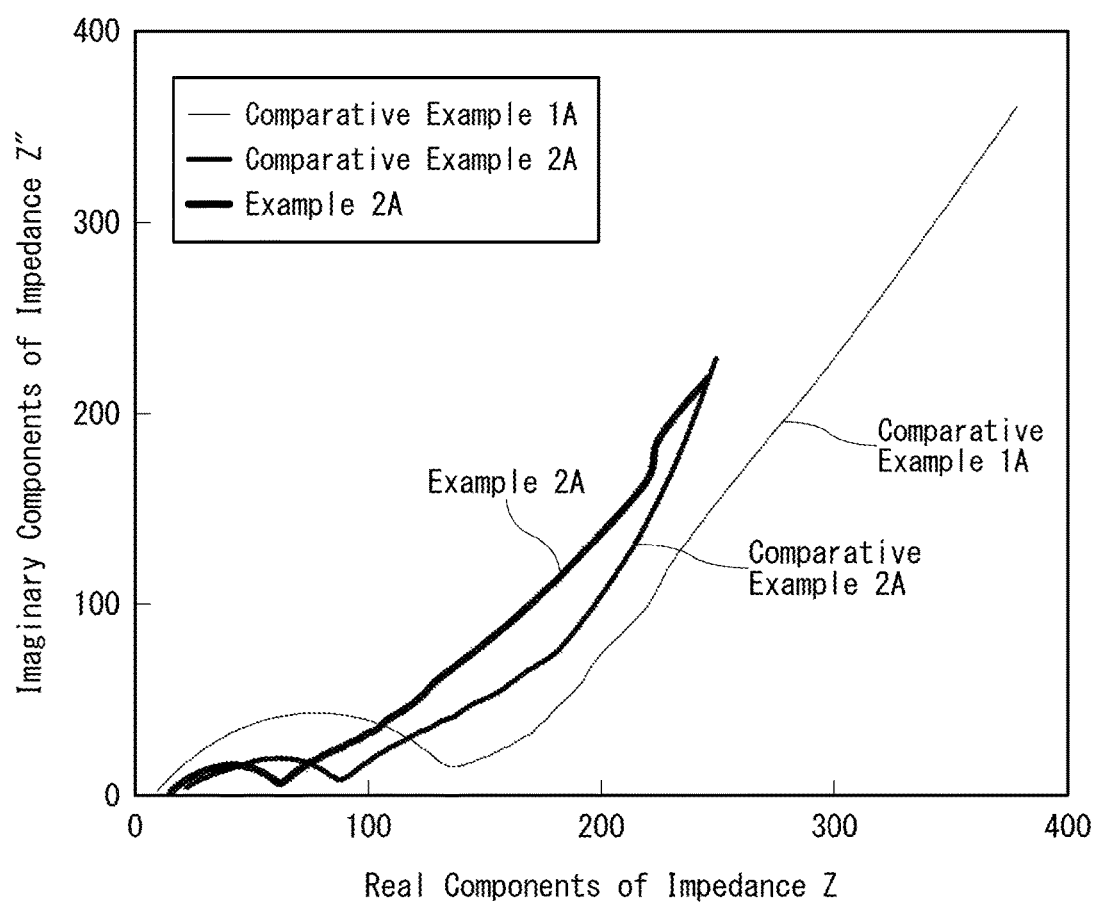
FIG. 12 is a graph showing the Cole-Cole plots of the tungsten oxide powders (electrode materials) of Example 2 and Comparative Examples 1 and 2.

Further, the impedance characteristics of the capacitors according to Example 2A and Comparative Examples 1A and 2A were investigated. The impedance characteristics were investigated by an AC impedance method using an equivalent circuit shown in FIG. 11. FIG. 12 shows the results as Cole-Cole plots. In FIG. 12, the horizontal axis represents the real components of the impedance, and the vertical axis represents the imaginary components of the impedance. The AC impedance method can measure, for example, the charge transfer resistance at the interface between the electrode and the electrolyte.

As is obvious from the results shown in FIG. 12, the size of the semicircle of the graph is larger in Comparative Example 1A and Comparative Example 2A than in Example 2A. The size of the semicircle indicates the charge transfer resistance at the interface between the electrode layer and the electrolyte. Example 2A shows a small semicircle. This means that Example 2A has a small charge transfer resistance. It was found that the electrode layers and batteries that use the electrode material having the hopping conduction characteristics by controlling oxygen defects have high capacity and are capable of high-speed charging/discharging.

Examples 5 and 6 and Comparative Example 3

A molybdenum oxide ($MoO_3$) powder having an average particle size of 1 μm was prepared. This molybdenum oxide powder was subjected to heat treatment for 60 minutes in atmospheric air.

Next, a heat treatment under conditions shown in Table 8 was conducted in a nitrogen atmosphere.

TABLE 8

| Sample No. | Heat Treatment in Nitrogen Atmosphere |
|---|---|
| Example 5 | 750° C. × 5 min. |
| Example 6 | 650° C. × 5 min. |
| Comparative Example 3 | None |

For the obtained molybdenum oxide powder, the composition and the average particle size were measured. Further, the activation energy $E_\alpha$ (eV), the amount of oxygen defects, and the carrier density were measured. Table 9 below shows the measurement results.

TABLE 9

| Sample No. | Composition ($MoO_{3-x}$) x Value | Average Particle Size (μm) | Activation Energy $E_\alpha$ (eV) | Amount of Oxygen Defects (cm$^{-3}$) | Carrier Density (cm$^{-3}$) |
|---|---|---|---|---|---|
| Example 5 | 0.034 | 1.5 | 0.03 | $2 \times 10^{19}$ | $2 \times 10^{19}$ |
| Example 6 | 0.025 | 1.3 | 0.04 | $1 \times 10^{19}$ | $1 \times 10^{19}$ |
| Comparative Example 3 | 0.001 | 1.0 | 0.19 | $1 \times 10^{14}$ | $1 \times 10^{14}$ |

For the molybdenum oxide powders according to Examples 5 and 6 and Comparative Example 3, the relationship between the temperature and the resistivity was measured in the same manner as in Example 1. As a result, there was almost no change in resistivity with 1000/T in the range of 2.8 to 4.0, and the hopping conduction characteristics were given, as in the tungsten oxide powders of Examples 1 to 3 (FIG. 2).

Examples 5A and 6A and Comparative Example 3A

Capacitors according to Examples 5A and 6A and Comparative Example 3A were produced in the same manner as in Example 1, except that the electrode material was changed to those of Examples 5 and 6 and Comparative Example 3. For each capacitor, the initial capacitance, the capacity retention after the cycle test, and the internal resistance value were measured by the same method as in Example 1A. Table 10 below shows the measurement results.

TABLE 10

| Sample No. | Electrode Material | Initial Capacitance (mAh/g) | Capacity Retention after Cycle Test (%) | Internal Resistance Value ($\Omega \cdot cm^2$) |
|---|---|---|---|---|
| Example 5A | Example 5 | 62.1 | 85.1 | 8.8 |
| Example 6A | Example 6 | 60.5 | 82.2 | 7.5 |
| Comparative Example 3A | Comparative Example 3 | 50.7 | 74.8 | 14.1 |

Further, the charge/discharge efficiency was determined using the capacitors of Examples 5A and 6A and Comparative Example 3A by the same method as in Example 1A. Table 11 below shows the results.

TABLE 11

| | Capacitance Ratio with respect to Rate (C) | | | | |
|---|---|---|---|---|---|
| Sample No. | 1 | 2 | 3 | 4 | 5 |
| Example 5A | 0.71 | 0.58 | 0.51 | 0.46 | 0.42 |
| Example 6A | 0.72 | 0.60 | 0.52 | 0.47 | 0.43 |
| Comparative Example 3A | 0.55 | 0.42 | 0.35 | 0.30 | 0.26 |

As is obvious from the results shown in Table 11 above, the capacitor according to each Example had excellent electrical characteristics. It was found that the characteristics of batteries (capacitors) are improved by using the electrode material prepared to have the hopping conduction characteristics by controlling the activation energy $E_\alpha$ and the amount of defects in this way.

Example 7

In Example 7, the heat treatment conditions of the tungsten oxide powder in nitrogen of Example 2 were changed to heat treatment conditions in a mixed gas of nitrogen and hydrogen. The mixed gas of nitrogen and hydrogen is composed of 3 vol % of hydrogen and the rest of nitrogen. Further, the heat treatment conditions were at 700° C. for 5 minutes.

For the obtained tungsten oxide powder, the composition, the average particle size, the activation energy, the amount of oxygen defects, and the carrier density were measured by the same methods as in Example 2. Table 12 below shows the measurement results.

TABLE 12

| Sample No. | Composition ($WO_{3-x}$) x Value | Average Particle size (nm) | Activation Energy $E_\alpha$ (eV) | Amount of Oxygen Defects ($cm^{-3}$) | Carrier Density ($cm^{-3}$) |
|---|---|---|---|---|---|
| Example 7 | 0.203 | 28 | 0.01 | $10^{21}$ | $10^{20}$ |

The resistivity at 1000/T of the tungsten oxide powders according to Example 7 was investigated. In this connection, T represents the measurement temperature, and the unit was Kelvin (° K). The unit of the resistivity was $\Omega cm$. As a result of the measurement, the resistivity was 10 $\Omega cm$ or less at any point with 1000/T in the range of 2.8 to 4.0. Therefore, it was confirmed that the tungsten oxide powder according to Example 7 exhibits the hopping conduction.

Example 7A

A capacitor was created using the tungsten oxide powder of Example 7 instead of the electrode material of the capacitor of Example 2A, to serve as Example 7A. Using the same measurement method as in Example 2A, the initial capacitance and the capacity retention after the cycle test were measured. Table 13 below shows the measurement results.

TABLE 13

| Sample No. | Electrode Material | Initial Capacitance (mAh/g) | Capacity Retention after Cycle Test (%) | Internal Resistance Value ($\Omega \cdot cm^2$) |
|---|---|---|---|---|
| Example 7A | Example 7 | 73.2 | 89.2 | 8 |

As is obvious from the results shown in Table 13 above, the capacitor according to Example 7A exhibited excellent characteristics. This is due to the amount of oxygen defects being increased.

Figure 13:
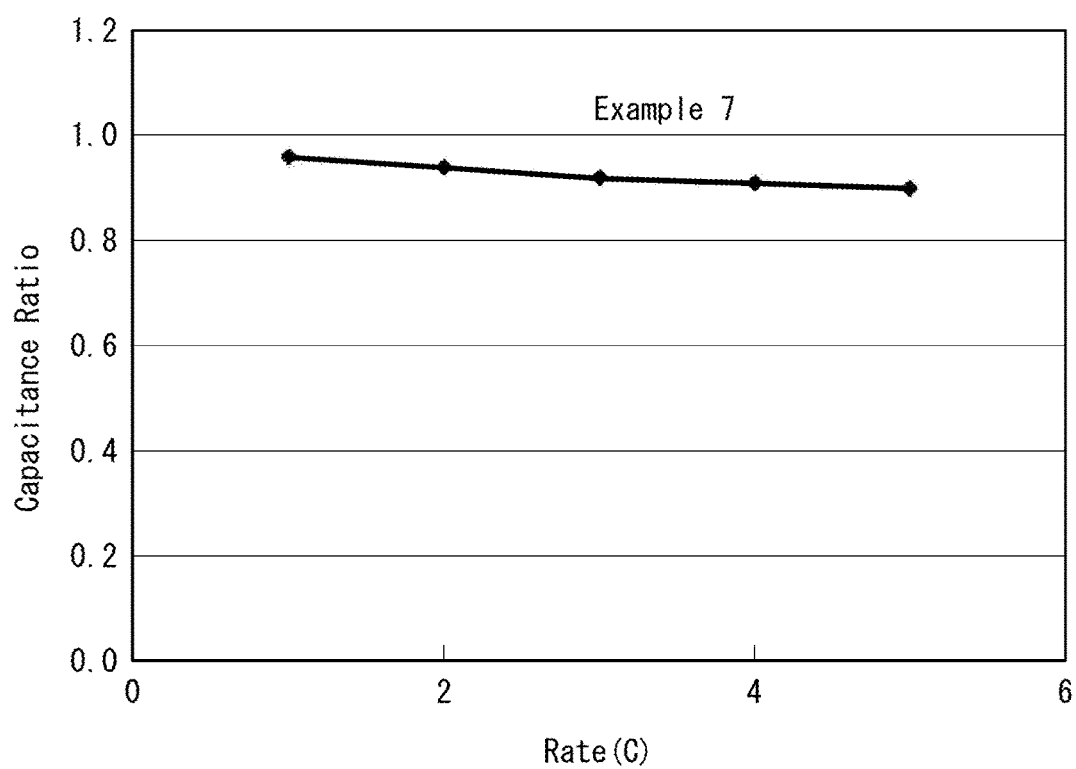
FIG. 13 is a graph showing the charge/discharge characteristics of an electrode layer using the tungsten oxide powder (electrode material) of Example 7.

Next, the temperature dependence of the power density and the capacitance ratio with respect to the rate (C) were measured. The measurement methods were the same methods as in Example 2A. Table 14 and Table 15 show the measurement results. Further, FIG. 13 shows the measurement results of the rate capability.

TABLE 14

| | Power Density (W/kg) | | |
|---|---|---|---|
| Sample No. | −15° C. | 25° C. | 60° C. |
| Example 7A | 3480 | 3500 | 3470 |

TABLE 15

| | Capacitance Ratio with respect to Rate (C.) | | | | |
|---|---|---|---|---|---|
| Sample No. | 1 | 2 | 3 | 4 | 5 |
| Example 7A | 0.96 | 0.94 | 0.92 | 0.91 | 0.90 |

As is obvious from the results shown in Table 14 and Table 15 above, the capacitor according to Example 7A exhibited excellent characteristics. Further, the power density and the rate capability were also improved by increasing oxygen defects.

Hereinbefore, some embodiments of the present invention have been exemplified, but these embodiments are presented as examples and are not intended to limit the scope of the invention. These novel embodiments can be implemented as various other forms, and various omissions, substitutions, changes, and the like can be made without departing from the gist of the invention. These embodiments and modifications thereof are included in the scope and gist of the invention and included in the invention described in the claims and the equivalent scope thereof. In addition, the above-described embodiments can be implemented in combination with each other.

REFERENCE SIGNS LIST

1: Electrode material
2: Measurement sample

3: n-Si layer
4: SiO$_2$ layer
5: Electrode layer composed of tungsten oxide powder of Example (or Comparative Example)
6: Metal electrode
20: Capacitor
21: Anode-side electrode layer
22: Anode layer
23: Separator layer
24: Cathode layer
25: Cathode-side electrode layer

The invention claimed is:

1. An electrode material comprising at least one metal compound powder selected from the group consisting of tungsten oxide, molybdenum oxide, Mo$_x$W$_y$O$_z$, where 0<x≤1, 0<y≤1, x+y=1, and 2≤z≤3, lithium tungstate, lithium molybdate and molybdenum sulfide,
wherein the at least one metal compound powder has an average particle size of 50 μm or less, an activation energy E$_\alpha$ of 0.05 eV or less, a carrier density of 1×10$^{18}$cm$^{-3}$ or more, and wherein an amount of oxygen defects in the at least one metal compound powder is 1×10$^{18}$ cm$^{-3}$ or more.

2. The electrode material according to claim 1, wherein the at least one metal compound powder has hopping conduction characteristics at room temperature of 25° C.

3. The electrode material according to claim 1, wherein the at least one metal compound powder has hopping conduction characteristics with a 1000/T value in a range of 2.8 to 4.0 when a measurement temperature is referred to as T (° K).

4. The electrode material according to claim 1, wherein the at least one metal compound powder has a resistivity of 10 Ωcm or less at room temperature of 25° C.

5. The electrode material according to claim 1, wherein the at least one metal compound powder has an average particle size of 10 μm or less.

6. An electrode layer comprising 50 mass % or more and 100 mass % or less of the electrode material according to claim 1.

7. A battery comprising the electrode layer according to claim 6.

8. The battery according to claim 7, comprising the electrode layer as an anode.

9. An electrochromic device comprising the electrode material according to claim 1.

10. The electrode material according to claim 1, wherein the at least one metal compound powder has hopping conduction characteristics with a 1000/T value in a range of 2.8 to 4.0 when a measurement temperature is referred to as T (° K), and wherein the at least one metal compound powder has a resistivity of 10 Ωcm or less at room temperature of 25° C.

11. The battery according to claim 8, wherein the at least one metal compound powder of the electrode material has hopping conduction characteristics with a 1000/T value in a range of 2.8 to 4.0 when a measurement temperature is referred to as T (° K).

12. The electrochromic device according to claim 9, wherein the at least one metal compound powder of the electrode material has hopping conduction characteristics with a 1000/T value in a range of 2.8 to 4.0 when a measurement temperature is referred to as T (° K).

* * * * *